US012501206B1

(12) United States Patent
Campagna et al.

(10) Patent No.: US 12,501,206 B1
(45) Date of Patent: Dec. 16, 2025

(54) SOUND ATTENUATOR WITH PUSH BUTTON ACTUATOR

(71) Applicant: Unplugs Hearing, Inc., Brooklyn, NY (US)

(72) Inventors: Ralph T. Campagna, Putnam, CT (US); Natan Bauman, Cheshire, CT (US)

(73) Assignee: Unplugs Hearing, Inc., Brooklyn, NY (US)

( * ) Notice: Subject to any disclaimer, the term of this patent is extended or adjusted under 35 U.S.C. 154(b) by 0 days.

(21) Appl. No.: 19/294,047

(22) Filed: Aug. 7, 2025

Related U.S. Application Data

(60) Provisional application No. 63/681,069, filed on Aug. 8, 2024.

(51) Int. Cl.

| | |
|---|---|
| ***H04R 25/00*** | (2006.01) |
| ***H04R 1/10*** | (2006.01) |
| ***H04R 1/28*** | (2006.01) |

(52) U.S. Cl.
CPC ......... *H04R 1/2873* (2013.01); *H04R 1/1016* (2013.01); *H04R 1/1041* (2013.01); *H04R 1/1083* (2013.01)

(58) Field of Classification Search
CPC ..... H04R 1/1066; H04R 1/1008; H04R 1/105
USPC .......................................................... 381/337
See application file for complete search history.

(56) References Cited

U.S. PATENT DOCUMENTS

2020/0059715 A1 * 2/2020 Hsiao .................. H04R 1/1041

FOREIGN PATENT DOCUMENTS

EP 2202996 A2 * 6/2010 ........... H04R 1/1041

* cited by examiner

*Primary Examiner* — Phylesha Dabney
(74) *Attorney, Agent, or Firm* — St. Onge Steward Johnston & Reens LLC; Stephen P. McNamara

(57) ABSTRACT

The sound attenuator has a hollow body formed of a base section and a top section. The body is generally triangular with curved walls and rounded points. The top section has an aperture in which is located an axially movable push button actuator having a sidewall with one or more openings therein. A spring biased reciprocating mechanism releasably engages the push button actuator to hold it in a closed position with the one or more openings located inside the body, an in an open position with the one or more openings located above the body. The sound attenuator has a sound attenuation of at least 15 decibels in the frequency range between 1.5 kHz and 4 kHz.

9 Claims, 21 Drawing Sheets

SOUND ATTENUATOR WITH PUSH BUTTON ACTUATOR

FIELD OF THE INVENTION

The present invention relates to the field of hearing protectors, and hearing devices such as hearing aids, tinnitus devices, and in-ear monitors.

BACKGROUND OF THE INVENTION

Excessive sound levels have been known to lead to hearing loss, and tinnitus, and other aural disorders. Even in the absence of clinical hearing loss, hearing can be affected with conditions such as “hidden hearing loss.” It has been reported that In addition, excessive sound levels can have other health effects, including hypertension, vasoconstriction, and other cardiovascular adverse effects leading to heart disease. Excessive levels of sound have been considered to be responsible for creating stress, increase workplace accident rates, and stimulate aggression and other anti-social behaviors.

To protect hearing and to avoid the negative effects of excessive noise exposure, many persons use hearing protectors. Hearing protectors of various designs are used in workplaces, particularly industrial workplaces and in construction workplaces, and when operating motor vehicles such as construction equipment and loud recreational vehicles such as such as snowmobiles and motorcycles. Hearing protectors are often also used at recreational locations such as music venues, casinos, shooting sports venues, sports arenas, and racing venues. The most standard type of hearing protector is a safety earmuff which has over the ear cups that isolate the ears from environmental sounds. There are also in-ear devices such as ear plugs/ear buds that isolate the ears from environmental sounds. The devices may be passive or may have an active electronic noise cancellation component.

A problem with many conventional hearing protectors is that their effectiveness at blocking or muffling excessive sound means that lower volume environmental sounds that are important for the wearer to hear are also blocked. In some situations, the louder volume sounds are intermittent or cyclical, and the wearer would like to hear the lower volume sounds such as warning sounds or alerting sounds in-between the periods when the louder volume sounds predominate. In such cases, the user will typically remove the hearing protector so that they can hear the lower volume sounds. But when the louder volume sounds return, they then have to replace the hearing protector. It is to be appreciated that this cannot happen instantaneously, because there is time involved in completing the task the user’s hands are occupied with, and locating and placing the hearing protector on the user’s ears, which may result in an incorrect placement of the hearing protector. The time involved may be enough to cause hearing and other damage as mentioned above. Repeated removals and insertions may also eventually lead to changes in the earing protector or ears that then lead to incorrect placement of the hearing protector.

A number of hearing protector designs have been proposed which provide different levels of sound attenuation, so that the user can keep the hearing protector on and make adjustments to the amount of attenuation to have a greater degree of sound attenuation and hearing protection in a loud noise environment, or a lesser degree of sound attenuation and hearing protection in a quiet sound environment. Examples of some prior designs of this type are shown in our prior U.S. Pat. Nos. 9,333,116; and 9,521,480; the disclosures of which are hereby incorporated by reference.

In the case of amplified hearing devices, e.g., hearing aids, tinnitus devices, in-ear monitors (such as are used by singers, musicians, public speakers, broadcasters, etc.), and similar hearing devices, a similar issue arises. Users of such hearing devices often desire to have an adjustable attenuation of environmental sounds, so they can adjust the mixture between the amplified sound delivered to the ear by the hearing device and the ambient sound delivered to the ear from the local environment. An example of a prior design of this type is shown in our prior U.S. Pat. No. 10,045,133; the disclosure of which is hereby incorporated by reference.

It would be desirable to provide a hearing protector and/or amplified hearing device adapted for nearly instant actuation to switch between a greater degree of environmental sound attenuation and a lesser degree of environmental sound attenuation according to the user’s needs in view of the sound environment. It would be desirable to provide a hearing protector and/or hearing device adapted for wearing in the ears providing a nearly instant actuation to switch between a greater degree of environmental sound attenuation and a lesser degree of environmental sound attenuation, particularly to allow the user to hear sound information such as alerts and warnings as needed.

SUMMARY OF THE INVENTION

It is an object of the invention to provide a sound attenuator that allows a user to instantaneously change of the level of sound attenuation and to allow the passage of sound information as needed without removing the attenuator from the ear.

It is an object of the invention to provide a sound attenuator that is comfortable and fits a wide variety of users without requiring customization.

The sound attenuator according to an embodiment of the invention has a hollow body formed of a base section and a top section and a hollow sound tube with an oval cross-section extending at an angle from the base section to a resilient eartip. The top section of the body has an aperture in which is located a preferably axially movable push button actuator. The push button actuator has a sidewall with one or more openings. A spring biased reciprocating mechanism releasably engages the push button actuator to hold it in a down (closed) position with the one or more openings in the sidewall located inside the body, blocking the openings and providing sound attenuation at the user’s ear. The spring biased reciprocating mechanism can be pushed on to release the push button actuator so it is moved to an up (open) position with the one or more openings in the sidewall located above the body so that sound can pass through the openings into the hollow body and into the hollow sound tube, where it is delivered to the user’s ear.

The top section has one or more seal insert that seal the push button actuator 70 when it is in the closed position and provide the user with an immediate sense of sound attenuation.

In an alternative embodiment, the axially movable push button actuator operates in the reverse manner, so that when the push button is in a down position it is in an open position, and when it is in an up position it is in a closed position. In this embodiment, the push button actuator has a plurality of channels or slots around its perimeter which extend from the button top surface to the button outer perimeter. The push button actuator has a flange which seals against the inner surface of the top section so that when the push button is in is in the up position the sound attenuator is closed. Pushing down on the push button releases the flange from the inner surface of the top section and sound can travel into the channels or slots and into the hollow body and into the hollow sound tube. A spring biased reciprocating mechanism releasably engages the push button actuator to hold it in the up position and the down position.

Preferably, the body is generally triangular with curved walls and rounded points. Preferably, the push button actuator has an outer button surface which is also generally triangular with curved sides and rounded points generally of the same shape as the body. The surface of the push button may be planar, concave or convex.

The sound attenuator has a sound attenuation of at least 15 decibels in the frequency range between 1.5 kHz and 4 kHz.

In one embodiment, the volume of the body hollow cavity is selected so that the body hollow cavity acts as a Helmholtz resonator tuned to 2 kHz.

In one embodiment, the one or more openings in the sidewall and/or base section have a total opening area, and open sound tube end has a sound tube end cross-sectional area, and wherein the total opening area is equal to or greater than the sound tube end cross-sectional area.

DETAILED DESCRIPTION OF THE INVENTION

Figure 1:
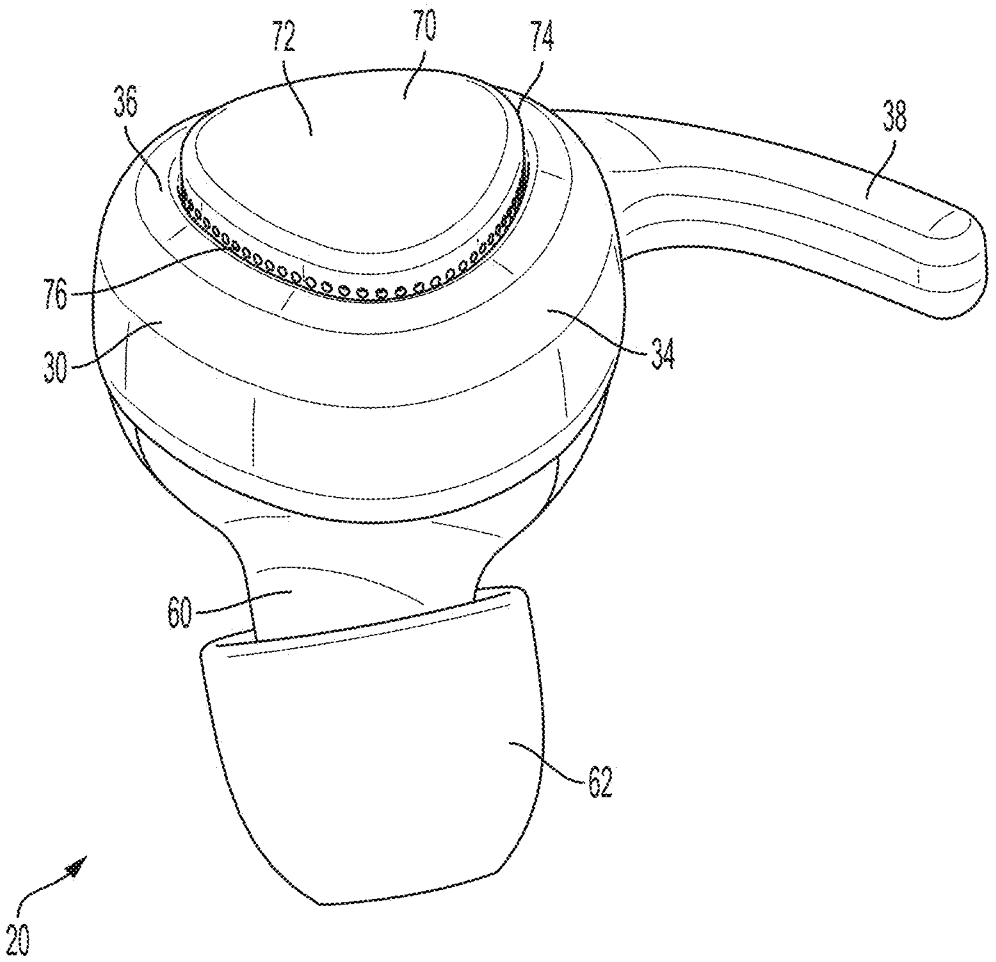
FIG. 1 is a front, top and left side perspective view of an embodiment of a sound attenuator in accordance with the invention showing the axially movable push button actuator in its up open position.
Figure 2:
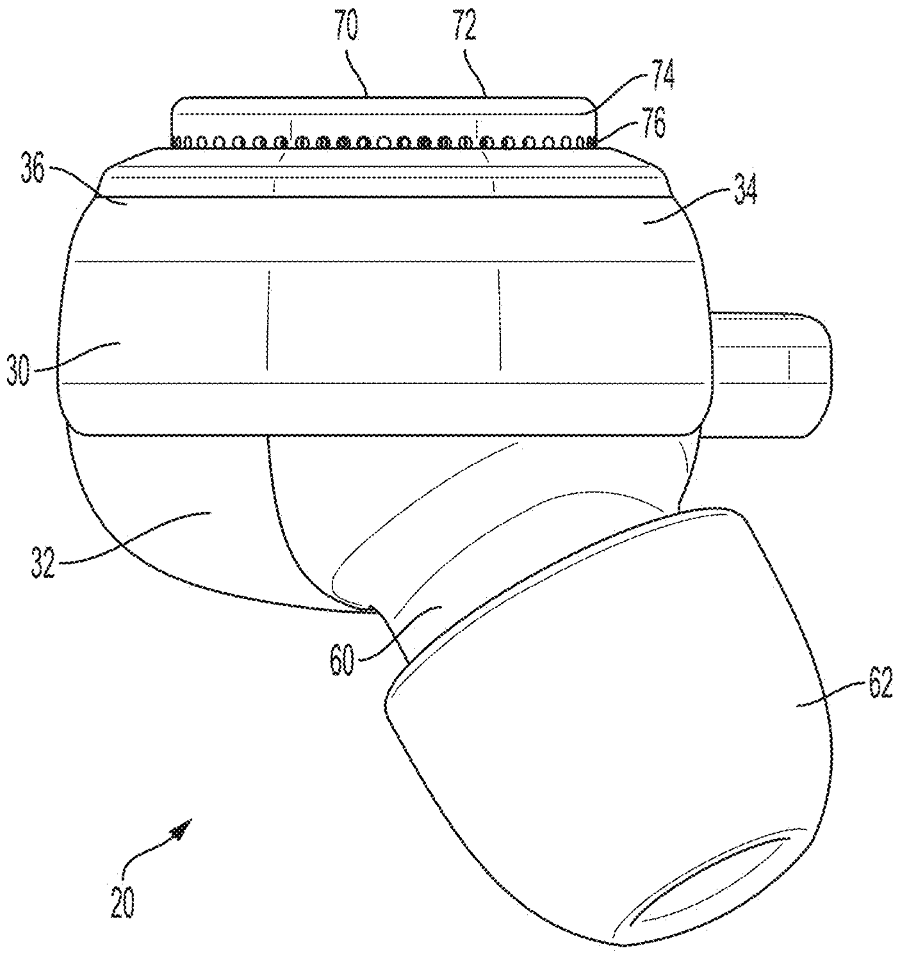
FIG. 2 is a front elevation view of the sound attenuator of FIG. 1
Figure 3:
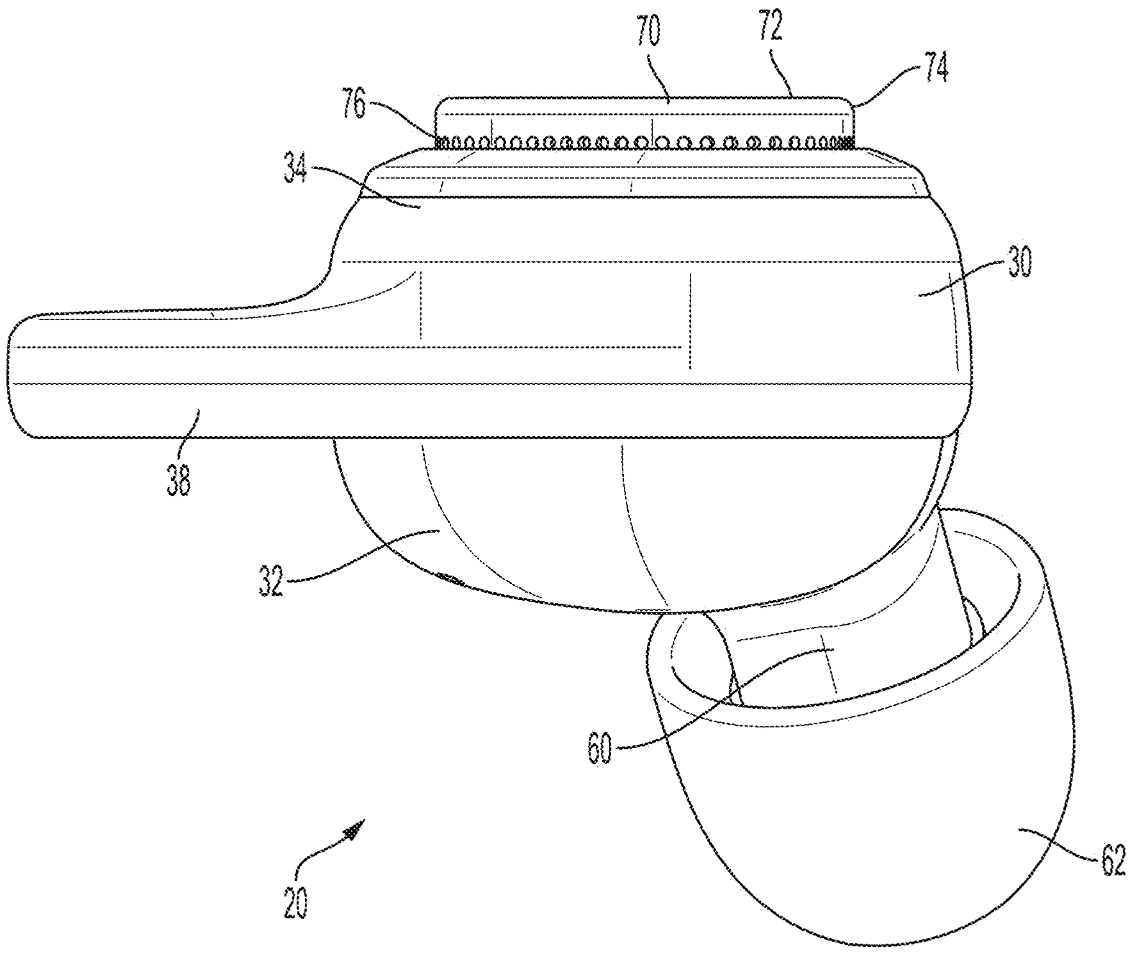
FIG. 3 right side elevation view of the sound attenuator of FIG. 1 is a rear elevation view of the sound attenuator of FIG. 1.
Figure 4:
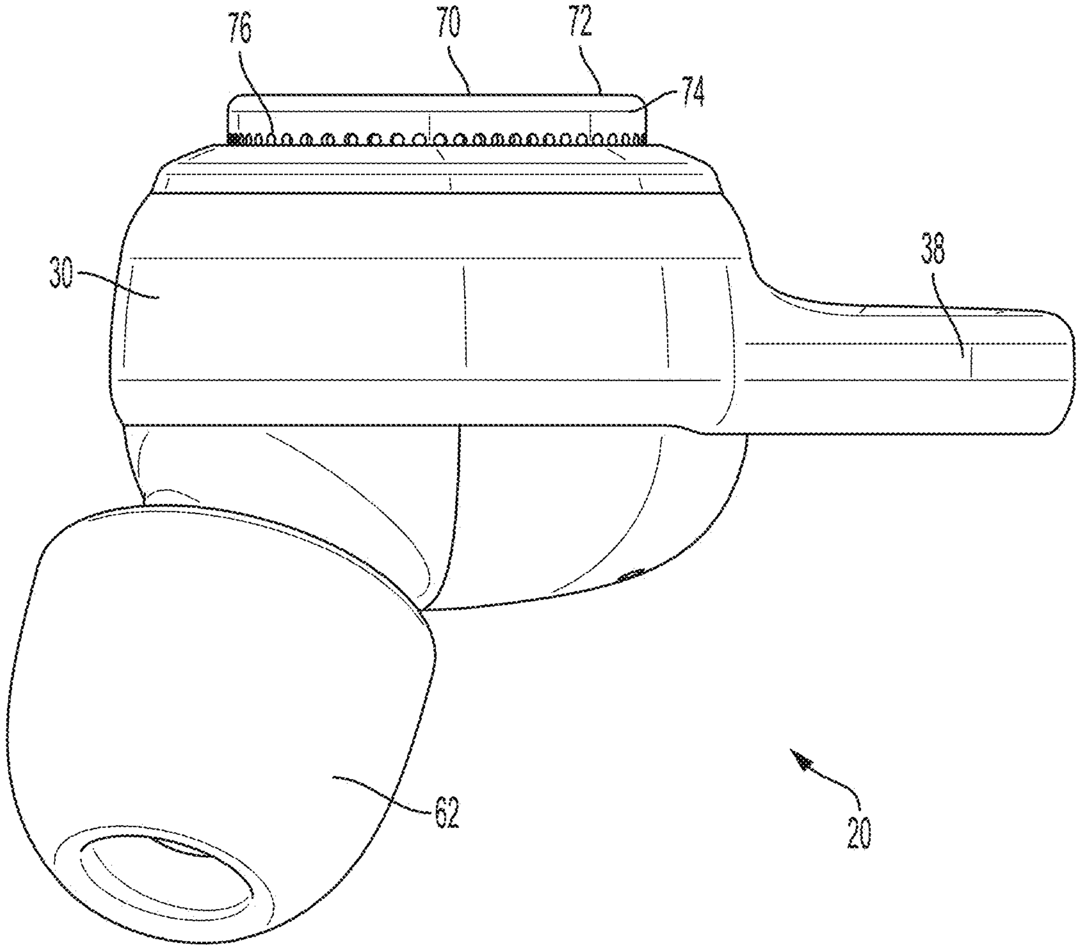
FIG. 4 is a left side elevation view of the sound attenuator of FIG. 1.
Figure 5:
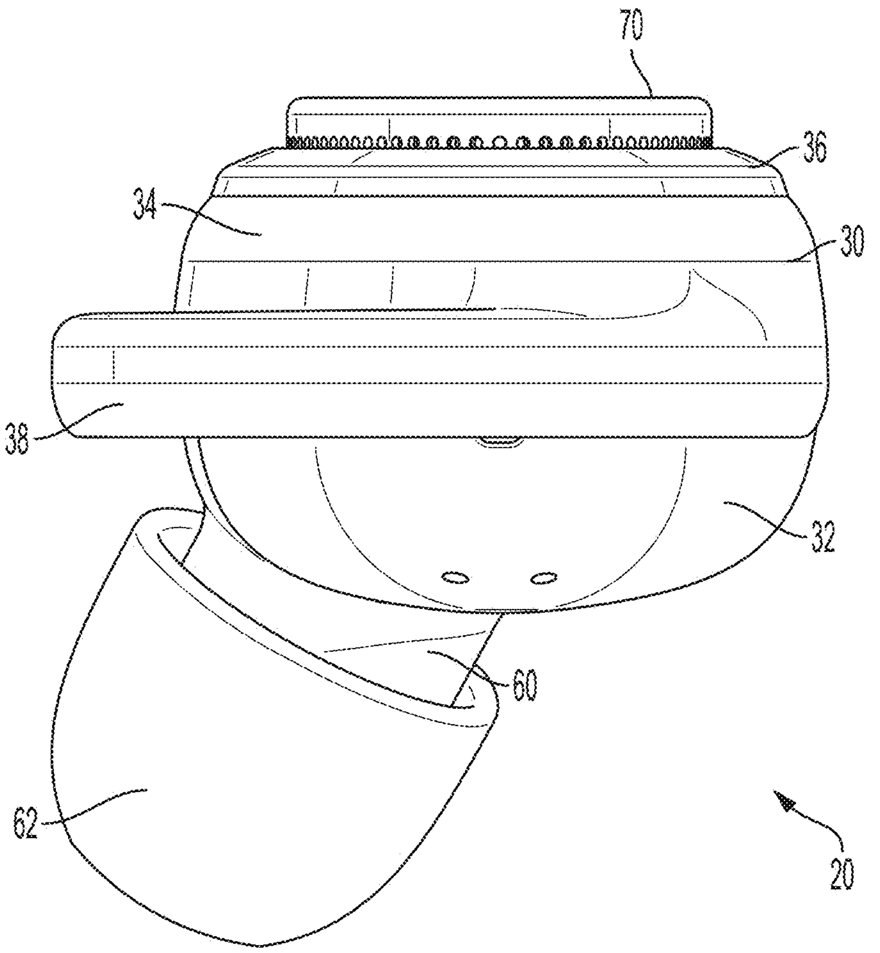
FIG. 5 is a rear elevation view of the sound attenuator of FIG. 1.
Figure 6:
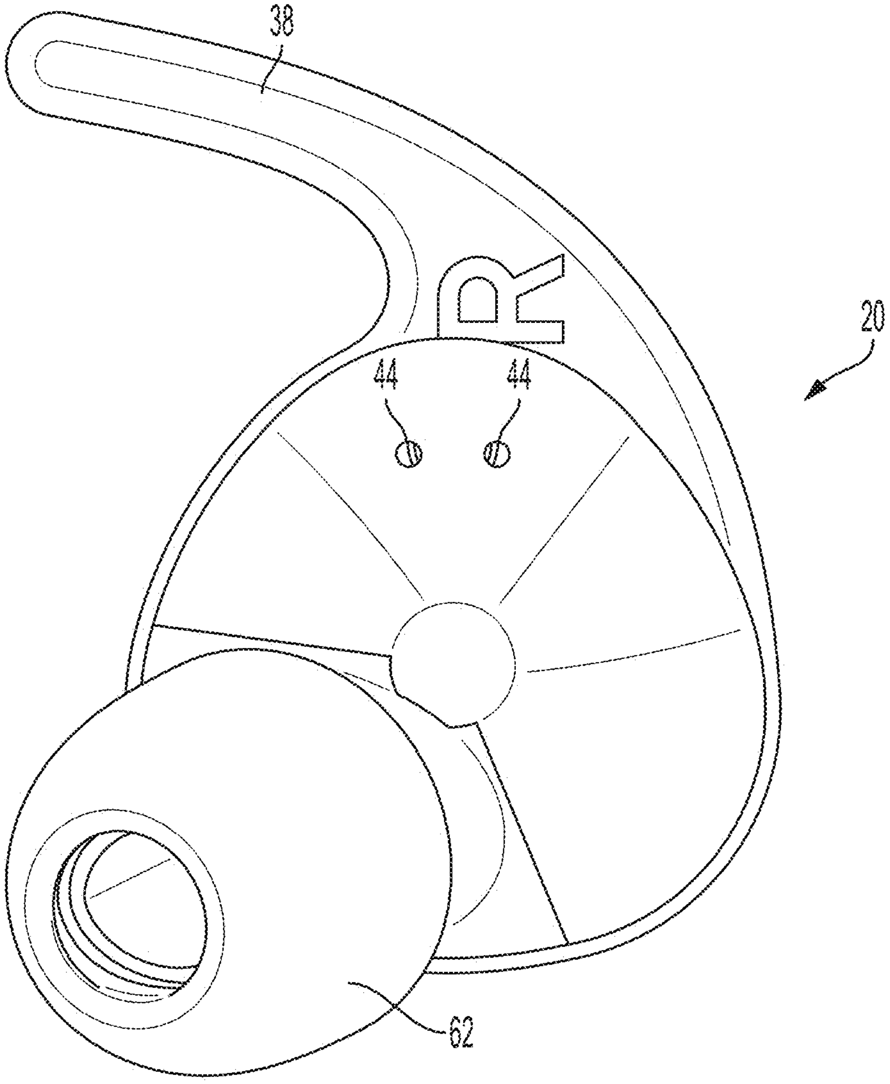
FIG. 6 is a bottom plan view of the sound attenuator of FIG. 1.
Figure 7:
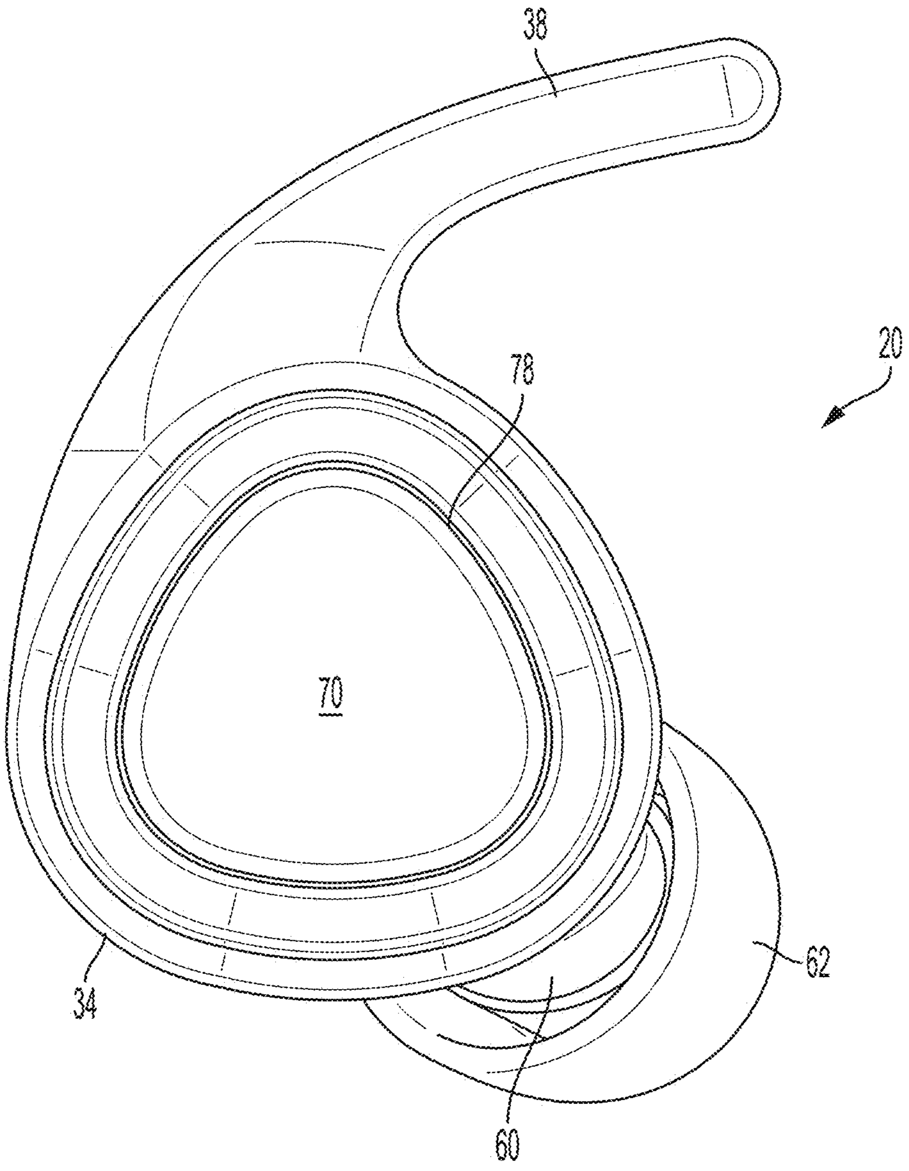
FIG. 7 is a top plan view of the sound attenuator of FIG. 1.
Figure 8:
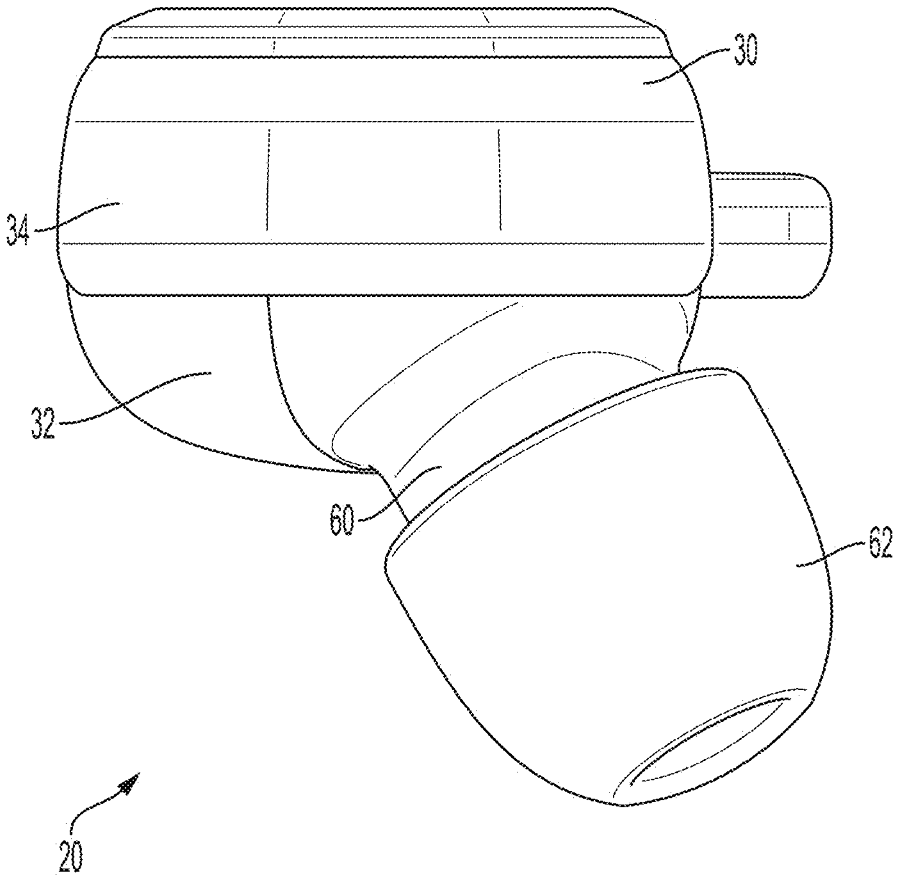
FIG. 8 is a front elevation view of the sound attenuator of FIG. 1 showing the axially movable push button actuator in its down closed position.
Figure 9:
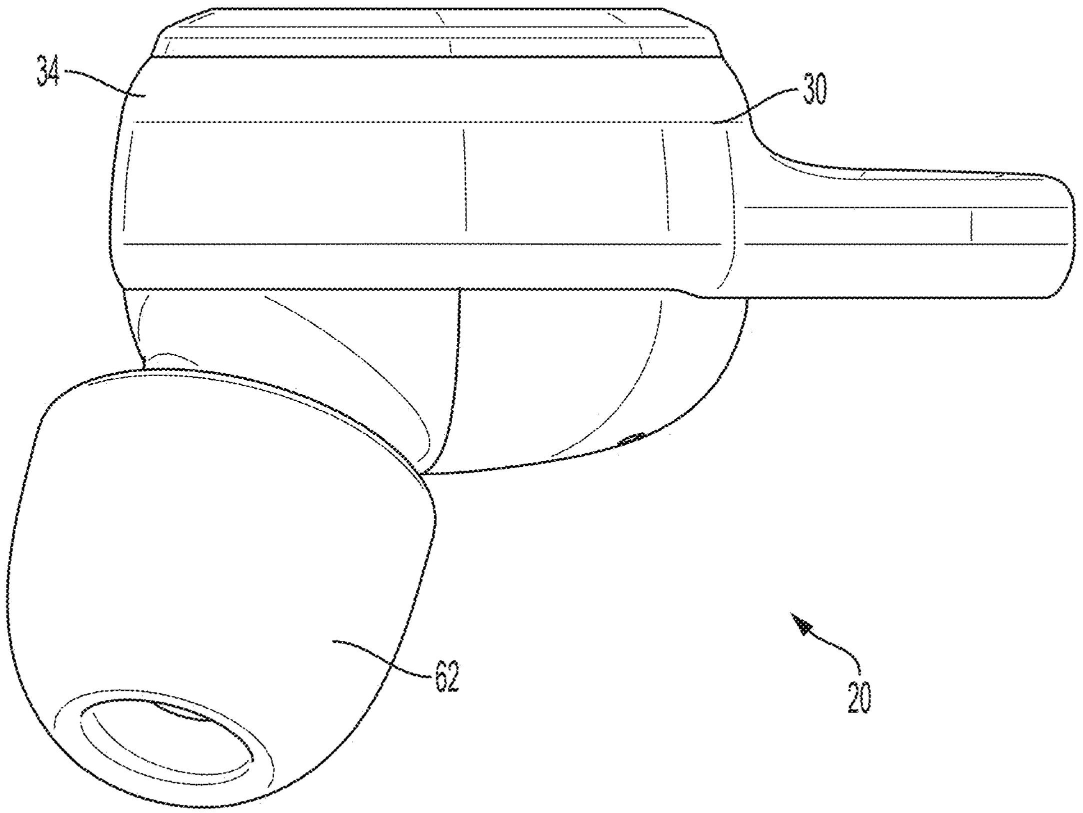
FIG. 9 is a left side elevation view of the sound attenuator of FIG. 8.
Figure 10:
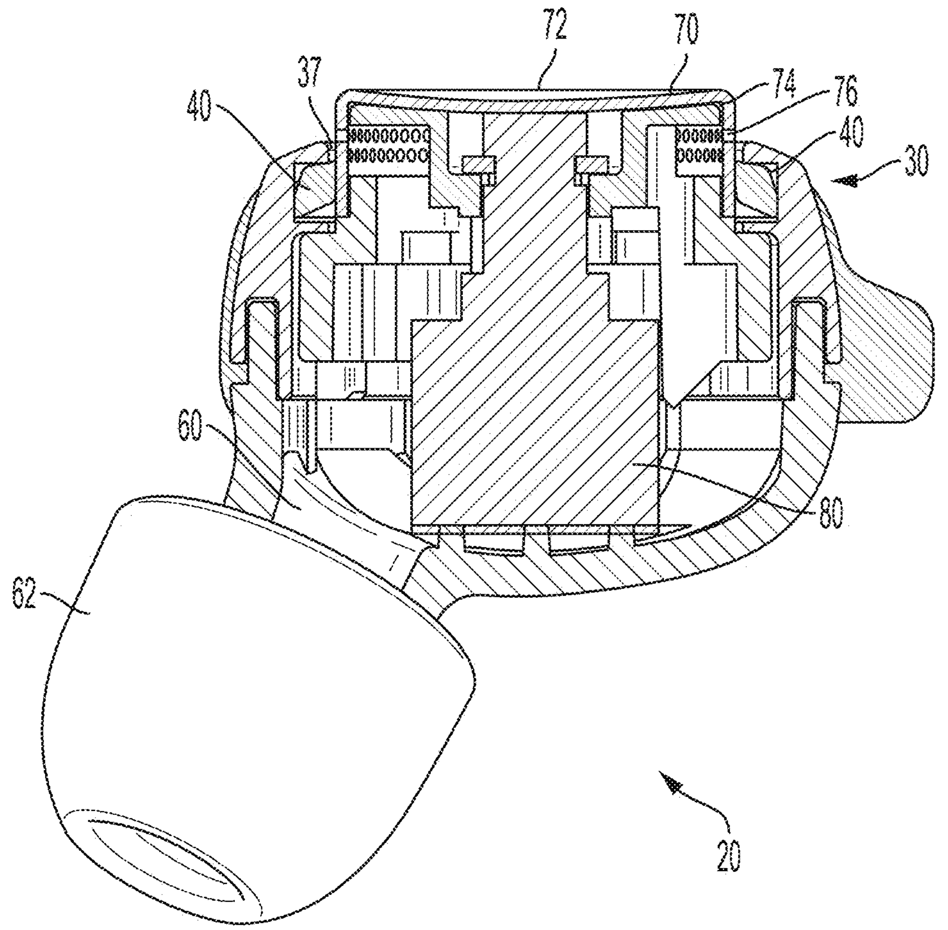
FIG. 10 is a partial cross-sectional elevation view of the sound attenuator of FIG. 1 showing the axially movable push button actuator in its up open position.

Referring now to FIGS. 1-12, a sound attenuator 20 is shown. Sound attenuator 20 is intended as the right ear sound attenuator of a pair of sound attenuators to be worn by a user. The left ear sound attenuator of the pair of sound attenuators will be a mirror image of the right ear sound attenuator 20.

Sound attenuator 20 has a hollow body 30, a sound tube 60, a push button actuator 70, and a spring biased reciprocating mechanism 80 which retains the push button actuator 70 in an open position or a closed position.

Hollow body 30 is formed of a base section 32 and a top section 34. Body 30 has a central vertical axis Y and related X and Z axes.

Base section 32 has a curved surface and a shape adapted to sit in the concha of a user's ear. In preferred embodiments, the body 30, and thus the base section 32 and the top section 34 are generally triangular in outline shape (and horizontal cross-section) with curved walls and rounded points. In such case the shape of body 30 is similar to a Reuleaux triangle with rounded points.

In one embodiment, an optional retaining arm 38 that will help to stabilize and retain the sound attenuator in the ear by engaging with antihelix or pinna of the ear can be integrally formed with the body 30 as shown in FIGS. 1-7, or can be provided as a separate snap on component.

Sound tube 60 is a hollow tube formed integrally with and extending from the side and/or bottom of base section 32 intended to be received in the user's external auditory canal. Sound tube 60 extends from the base section 32 at an angle relative to the central axis. In preferred embodiments, sound tube 60 extends from the base section 32 at an angle of around 30° relative to the Y axis along the X-Y. Further, the sound tube has an additional 10° offset whereby the sound tube 60 extends from the base section 32 at an angle of around 10° relative to the Y axis along the X-Z plane. Sound tube 60 has a resilient eartip 62. Eartip 62 is a silicone or other rubber piece as is typical of ear buds and other devices. Sound tube 60 has an open sound tube end 64 at the end of the eartip 62 for delivering sound to the user's external auditory canal. In preferred embodiments, sound tube 60 has an oval cross-section, to provide a maximum open cross-sectional area while still fitting comfortably in the user's external auditory canal. In one embodiment, the oval cross section has an open oval cross section area provided by a tube with a major radius which is 0.0875 inch and a minor radius which is 0.0625 inch, providing an open oval cross section area of 0.017 square inches.

In one embodiment, sound tube 60 is a replaceable part which is detachable from base section 32, for example, by a screw threaded connection or a bayonet mount (turn and lock mount) or a snap fit. In another embodiment, sound tube 60 is integrally formed with the base section 32.

In one embodiment, sound tube 60 is formed of a soft and flexible polymeric material.

In one embodiment, sound tube 60 has an exterior threaded surface also formed of a soft and flexible polymeric material, to provide a resilient engagement of the sound tube 60 with the user's outer auditory canal, so that the sound attenuator 20 is firmly retained in the user's ear.

In another embodiment, the eartip 62 has an exterior screw threaded or corkscrew or spiral surface also formed of a soft and flexible polymeric material, to provide a resilient engagement of the sound tube 60 with the user's outer auditory canal, so that the sound attenuator 20 is firmly retained in the user's ear.

Top section 34 also has a curved shape and has an upper surface 36 with an aperture 37 therein. Aperture 37 has a shape which conforms to the shape of the push button actuator 70.

Axially movable push button actuator 70 is provided in aperture 37 of the top section 34. Push button actuator 70 has an outer button surface 72 and a sidewall 74 having one or more openings 76 therein. Sidewall 72 extends downwardly from outer button surface 72 into the aperture 37 into top section 34. Push button actuator 70 is moveable between a closed position and an open position. When push button actuator 70 is in the closed position, the one or more openings 76 in the sidewall 74 are located inside the body 30, blocking the openings 76 and providing sound attenuation at the user's ear. When push button actuator 70 is in the open position, the one or more openings 76 in the sidewall 74 are located above the body 30 so that sound can pass through the openings 76 into the hollow body 30 and into the sound tube 60, where it is delivered to the user's ear.

Openings 76 may be of any convenient size or shape which is sufficient to provide the desired sonic transmission of environmental sounds to the user when the push button actuator 70 is in the open position. Openings 76 may be all of the same size or the openings 76 may be of different sizes or groups of different sizes. Openings 76 may be evenly distributed around the sidewall 74 or they may be have an unequal distribution around sidewall 74. In one embodiment, more openings 76 are located on the portion of the sidewall which faces forward when the sound attenuator 20 is worn by a user, than on the portion of the sidewall 74 which faces rearwardly when the sound attenuator 20 is worn by a user, so that the user experiences greater directionality when the user is wearing the sound attenuator 20 when the push button actuator 70 is in an open position. In the embodiment shown in FIG. 1-3, openings 76 are a single row of 45 or more perforations having a diameter of approximately 0.05 mm to 1.0 mm encircling the sidewall 74. Other embodiment may have two or three rows of perforations, or have a one row of perforations which encircles the sidewall 74 plus one or two shorter rows of perforations on the forward facing part of the sidewall 74.

In other possible embodiments, movement of the actuator may be obtained through other directions other than axial movement, for example, by lateral movement or rotation.

The outer button surface 72 of push button actuator 70 can have any of a variety of possible embodiments. The outer button surface 72 can be flat, or a convex bump extending up from the upper surface 36 of top section 34, or a concave indentation in the outer button surface 72 of push button actuator 70. The goal is to provide the outer button surface 72 with a surface that is recognizable to the user, so they can press on the push button actuator 70 to move it between an open and a closed position without any uncertainty or ambiguity about the position of the push button actuator 70. In a preferred embodiment, the outer button surface 72 is a concave fingertip indentation. In other embodiments, the outer button surface 72 is flush with and aligned with the upper surface 36 of the top section 34 when the push button actuator 70 is in the closed position.

Preferably, the push button actuator 70 has an outline shape 78 which is smaller than but having the same or similar outline as the shape of the body 30. Thus in a preferred embodiment, the push button actuator 70 has an outline shape 78 which is generally triangular in shape with curved walls and rounded points.

Figure 11:
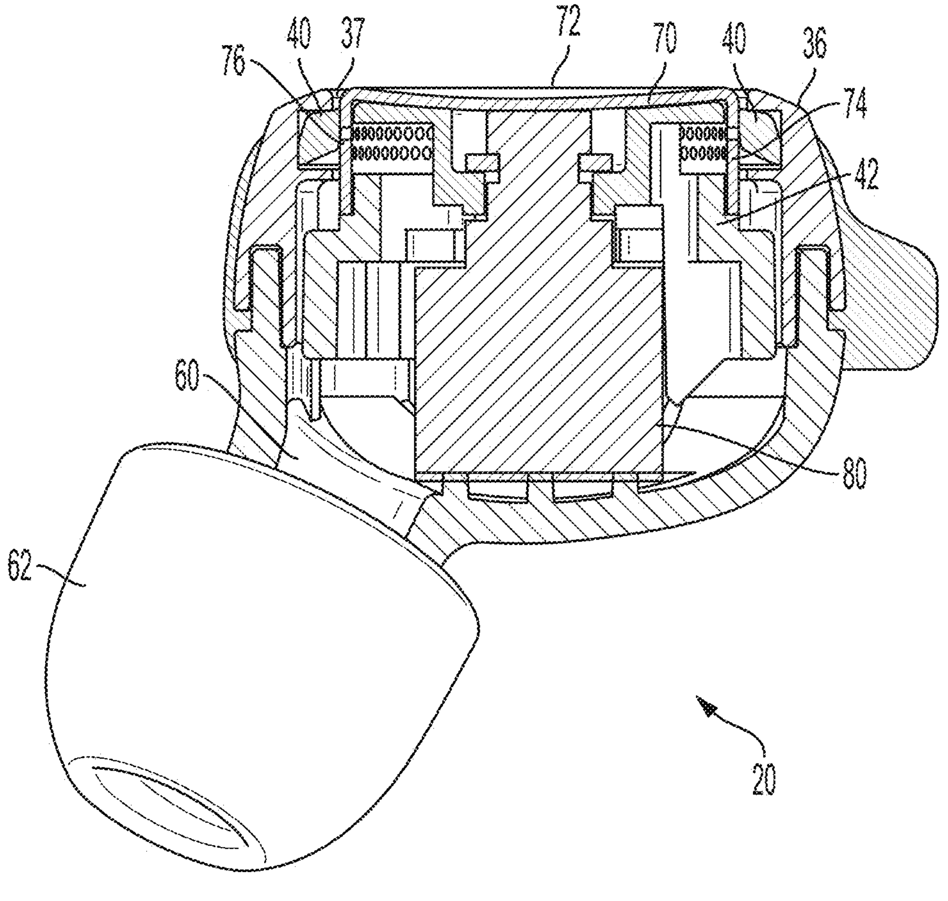
FIG. 11 is a partial cross-sectional elevation view of the sound attenuator of FIG. 8 showing the axially movable push button actuator in its down closed position.
Figure 12:
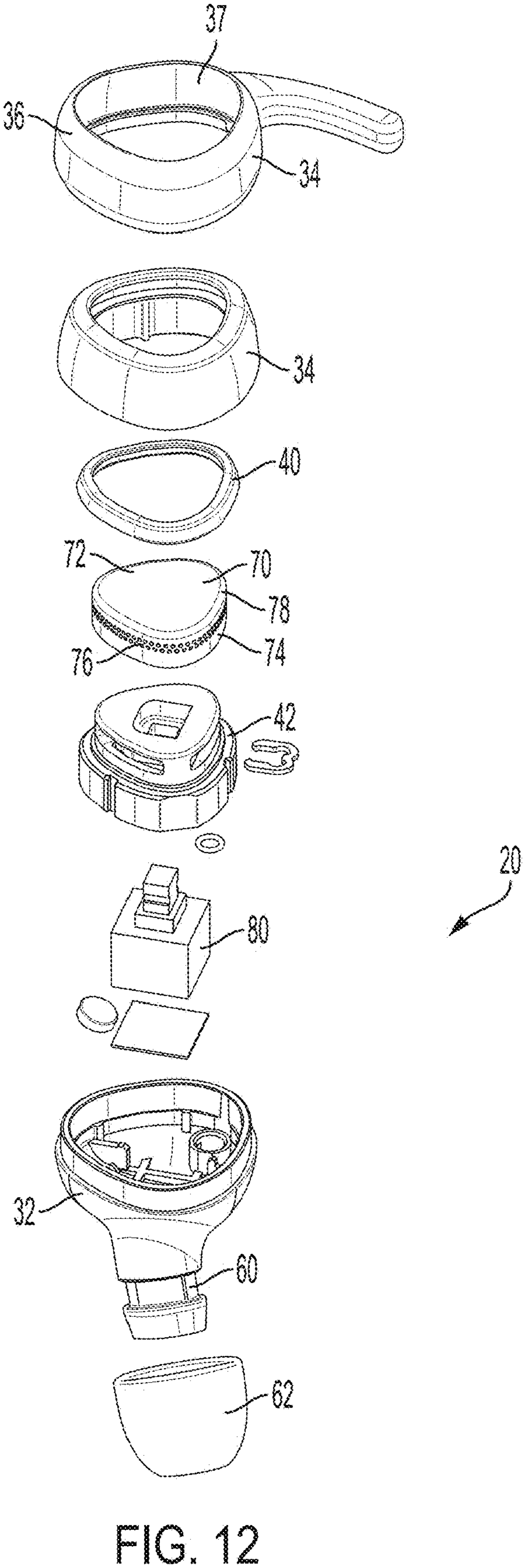
FIG. 12 is an exploded perspective view of the components of the sound attenuator of FIG. 1.

In one embodiment, the top section 34 has a seal insert 40 having an outline shape which matches the outline shape of the push button actuator 70. As seen in FIG. 11, seal insert 40 seals the openings 76 when the push button actuator 70 is in the down closed position. Desirably, an additional seal insert 42 provides an additional seal when the push button actuator 70 is in the down closed position. Seals 40 and 42 provide a distinct sense of sonic separation to the user, as if a barrier has closed.

The sealing effect of seals 40 and 42 is sufficiently strong that once the air in the sound attenuator 20 has been pushed out by the effect of the push button actuator 70 moving to the down closed position that a vacuum lock effect arises and the push button actuator 70 may be slow to move to the up open position. To prevent the vacuum lock effect, two small vent holes 44 are provided in the base section 32. When it is desired to move the push button actuator 70 to the up open position the vent holes 44 allow a sufficient amount of pressure equalization to prevent a vacuum lock.

Figure 15:
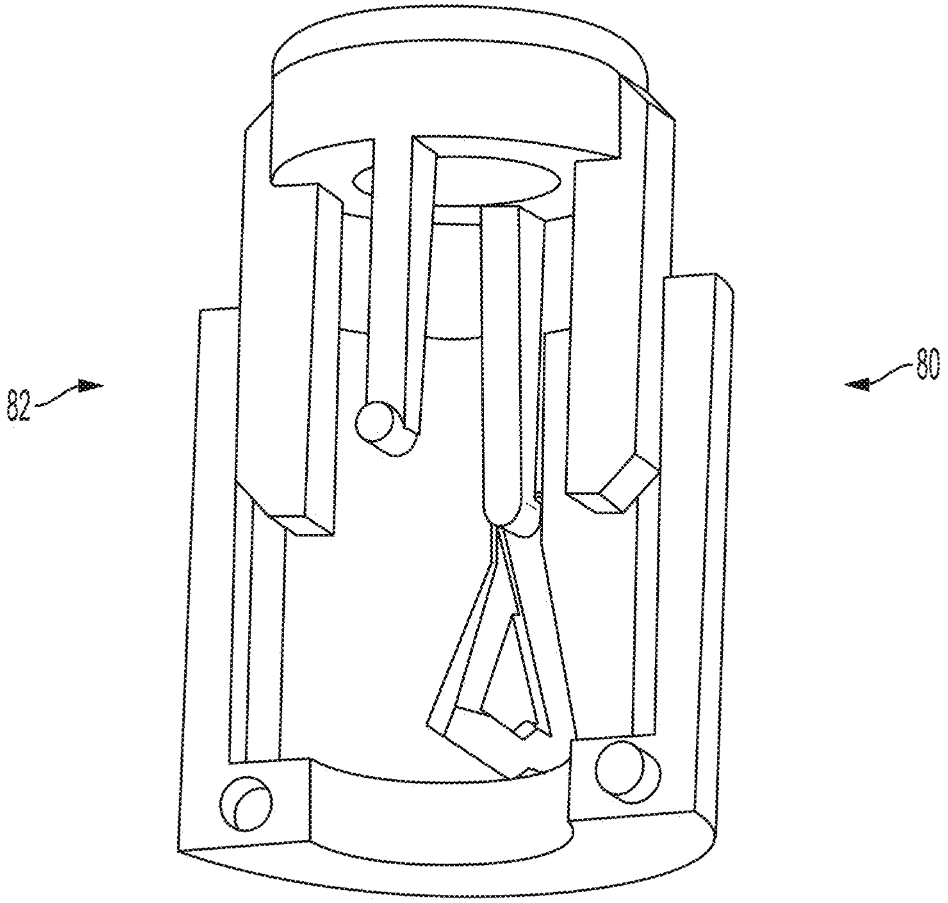
FIG. 15 is a breakaway view of an embodiment of a reciprocating mechanism for use in an embodiment of the invention.
Figure 16:
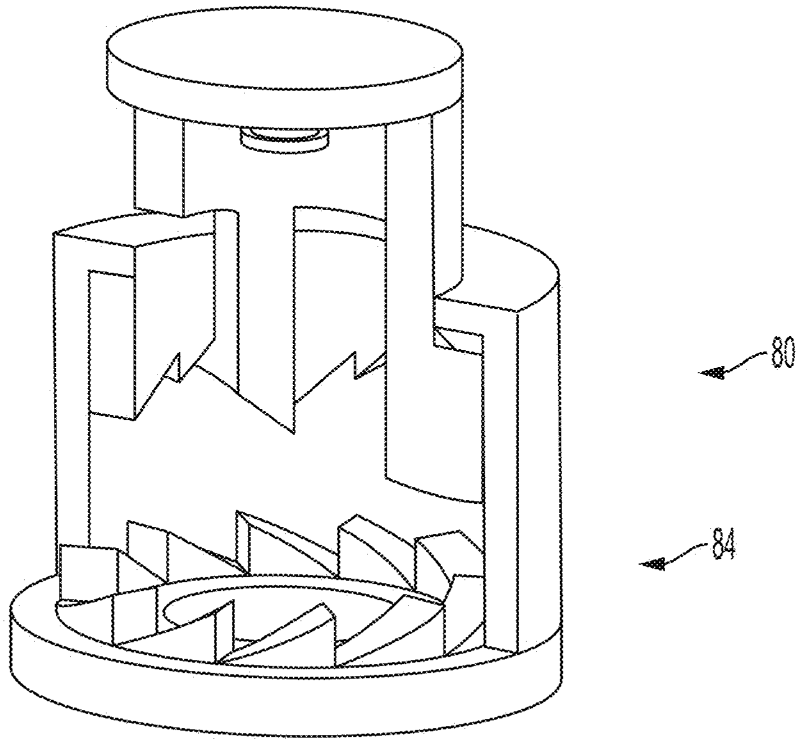
FIG. 16 is a breakaway view of another embodiment of a reciprocating mechanism for use in an embodiment of the invention.
Figure 17:
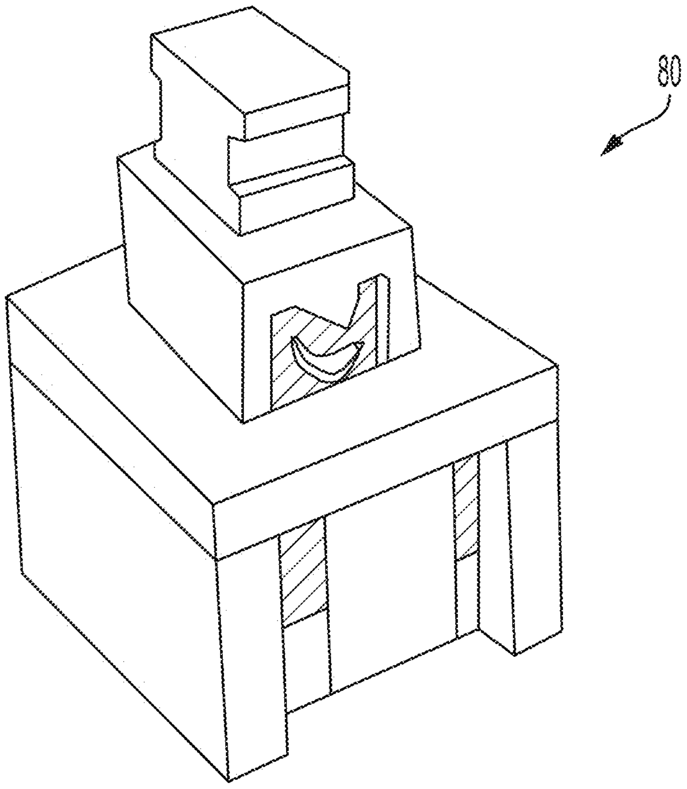
FIG. 17 is a perspective view of an embodiment of a reciprocating mechanism and resilient biasing means for the sound attenuator of FIG. 1 with the axially movable push button actuator in the open position.
Figure 18:
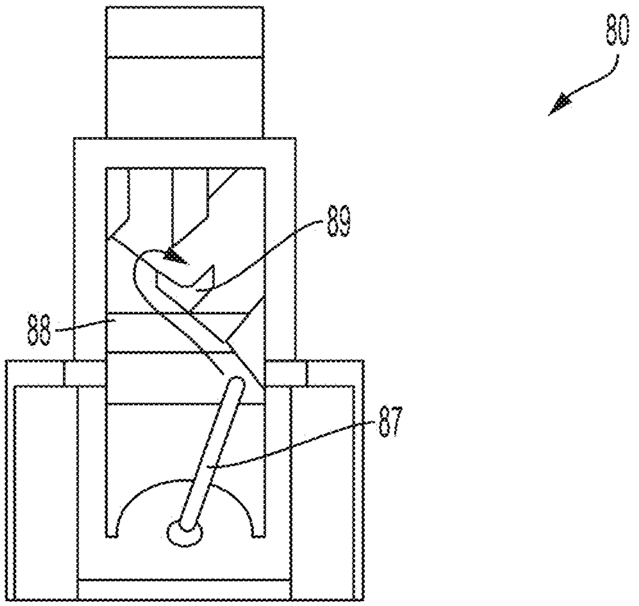
FIG. 18 is a cross-sectional view of the reciprocating mechanism and resilient biasing means of FIG. 17 with the axially movable push button actuator in the open position.
Figure 19:
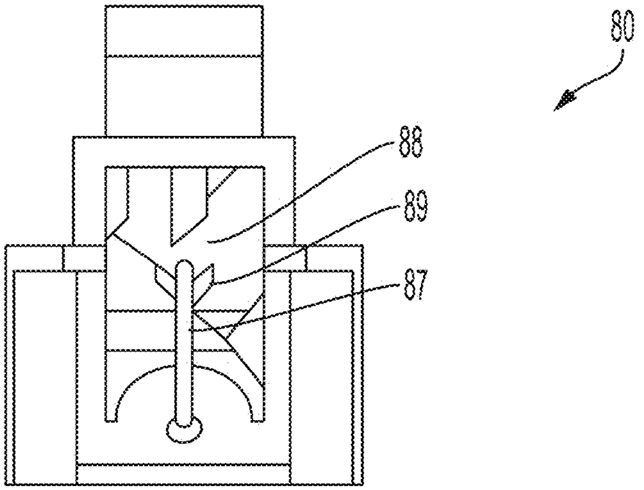
FIG. 19 is a perspective view of the reciprocating mechanism and resilient biasing means of FIG. 17 with the axially movable push button actuator in the closed position.

The spring biased reciprocating mechanism 80 retains the push button actuator 70 in the open position or the closed position. In one embodiment, shown in FIG. 15, the reciprocating mechanism 80 is a two position tracked system 82 with a spring (not shown). (See also US Pub 2012/0097679, the disclosure of which is incorporated by reference). In another embodiment, shown in FIG. 16, the reciprocating mechanism 80 is a ratchet mechanism 84 with a spring (not shown) in accordance with the disclosure of U.S. Pat. No. 3,288,115, the disclosure of which is incorporated by reference. In another embodiment, shown in FIGS. 17-19, the reciprocating mechanism 80 is a tracked mechanism 86 with a spring (not shown) in which a locking pin 87 follows track 88 where it is captured by latch 89.

Figure 20:
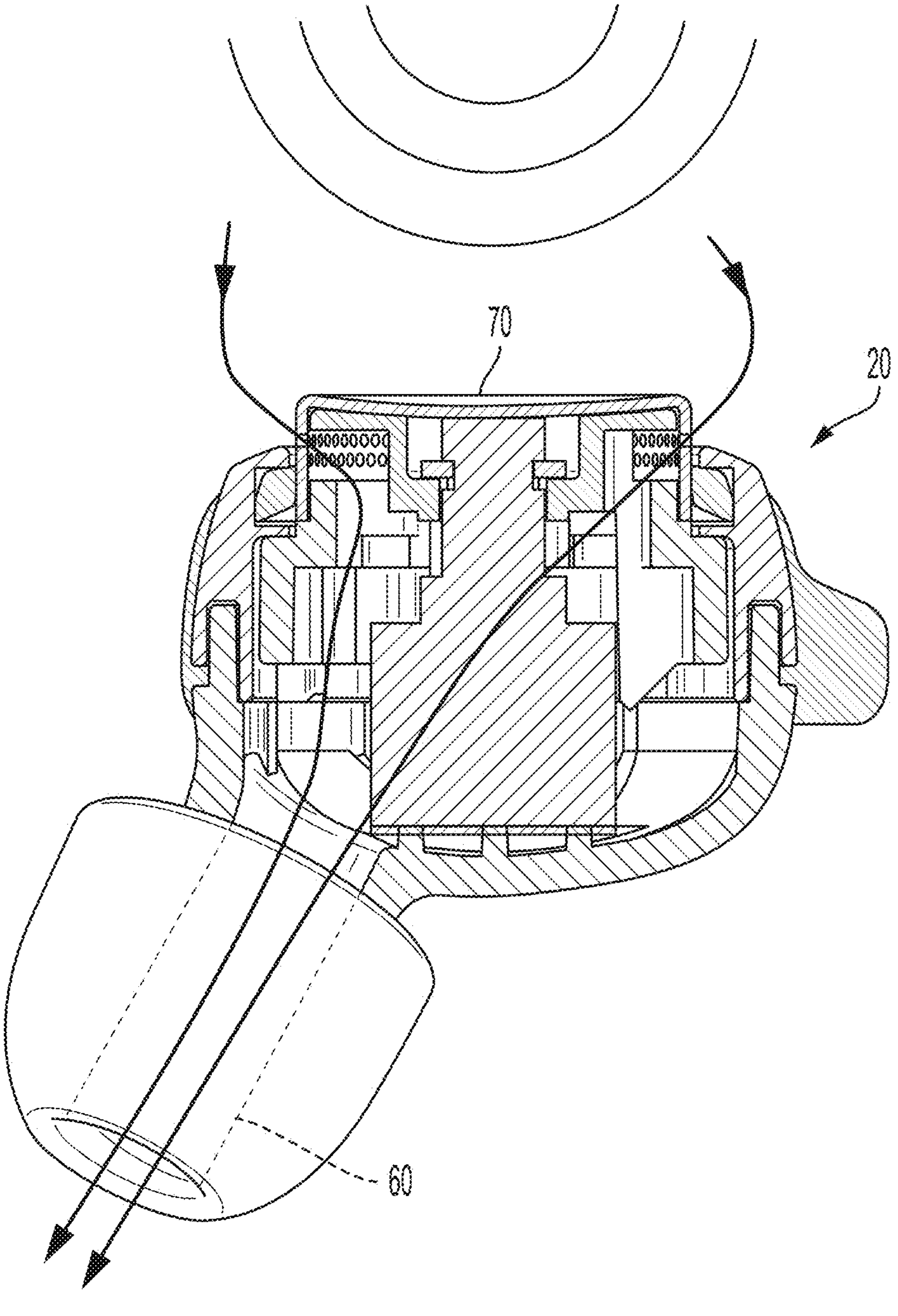
FIG. 20 is a cross-sectional view of the sound attenuator of FIG. 1 with the axially movable push button actuator in the open position illustrating sound transmission through the sound attenuator.

Sound transmission through the sound attenuator 20 with the axially movable push button actuator 70 in the open position can be understood with reference to FIG. 20. Sound enters the one or more openings 76 in the sidewall 74 in base section 32 and is released through the sound tube 60.

Figure 21:
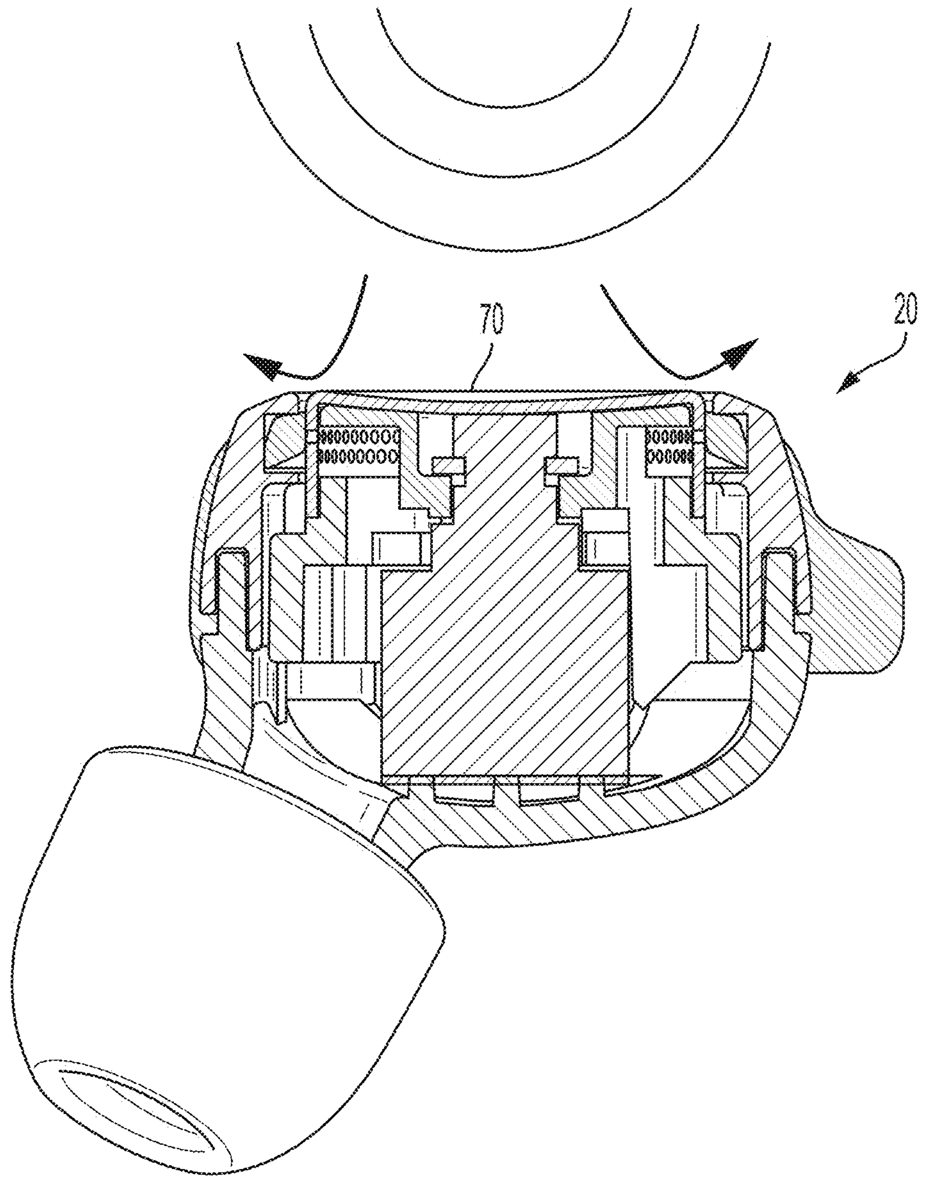
FIG. 21 is a cross-sectional view of the sound attenuator of FIG. 9 with the axially movable push button actuator in the closed position illustrating sound attenuation by the sound attenuator.

Sound transmission through the sound attenuator 20 with the axially movable push button actuator 70 in the closed position can be understood with reference to FIG. 21. Sound is blocked from entering the one or more openings 76 in the sidewall 74 in base section 32. Most sounds do not enter into the sound attenuator, and the sound exiting the sound tube 60 has been greatly reduced from the original sound level.

Figure 22:
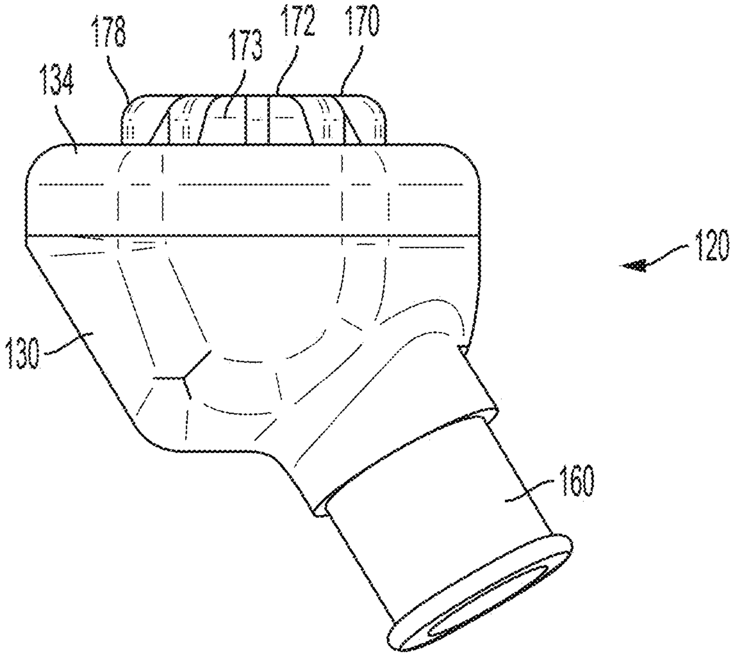
FIG. 22 is a side perspective view of another embodiment of a sound attenuator in accordance with the invention showing the axially movable push button actuator in its up closed position.
Figure 23:
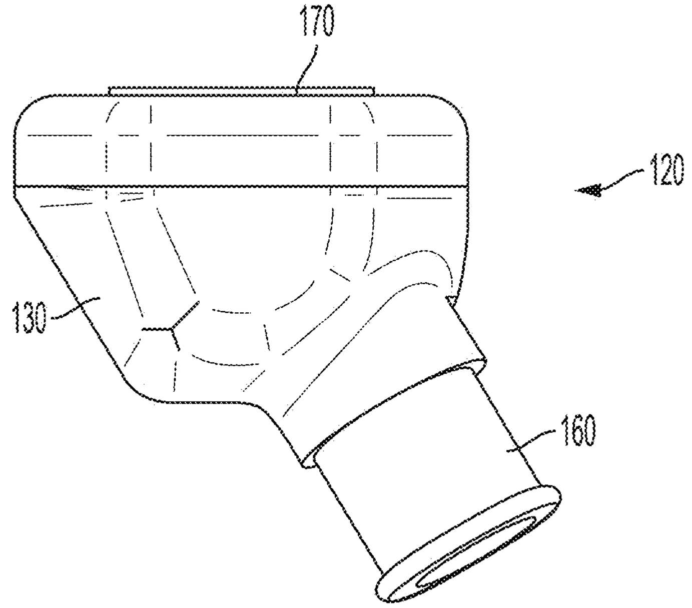
FIG. 23 is a side perspective view of the sound attenuator of FIG. 22 showing the axially movable push button actuator in its down open position.

An alternative embodiment of a sound attenuator 120 is shown in FIGS. 22-23. In this embodiment, the axially movable push button actuator 170 operates in the reverse manner as the embodiment of the sound attenuator 20, so that when the push button 170 is in a down position it is in an open position, and when it is in an up position it is in a closed position. In this embodiment, the push button actuator 170 has a plurality of channels or slots 173 around its perimeter 178 which extend from the outer button surface 172 to the button outer perimeter 178. The push button actuator 170 has a flange which seals against the inner surface of the top section 134 so that when the push button 170 is in the up position the sound attenuator is closed. Pushing down on the push button 170 releases the flange from the inner surface of the top section 134 and sound can travel into the channels or slots and into the hollow body 130 and into the hollow sound tube 160. A spring biased reciprocating mechanism releasably engages the push button actuator to hold it in the up position and the down position.

Figure 13:
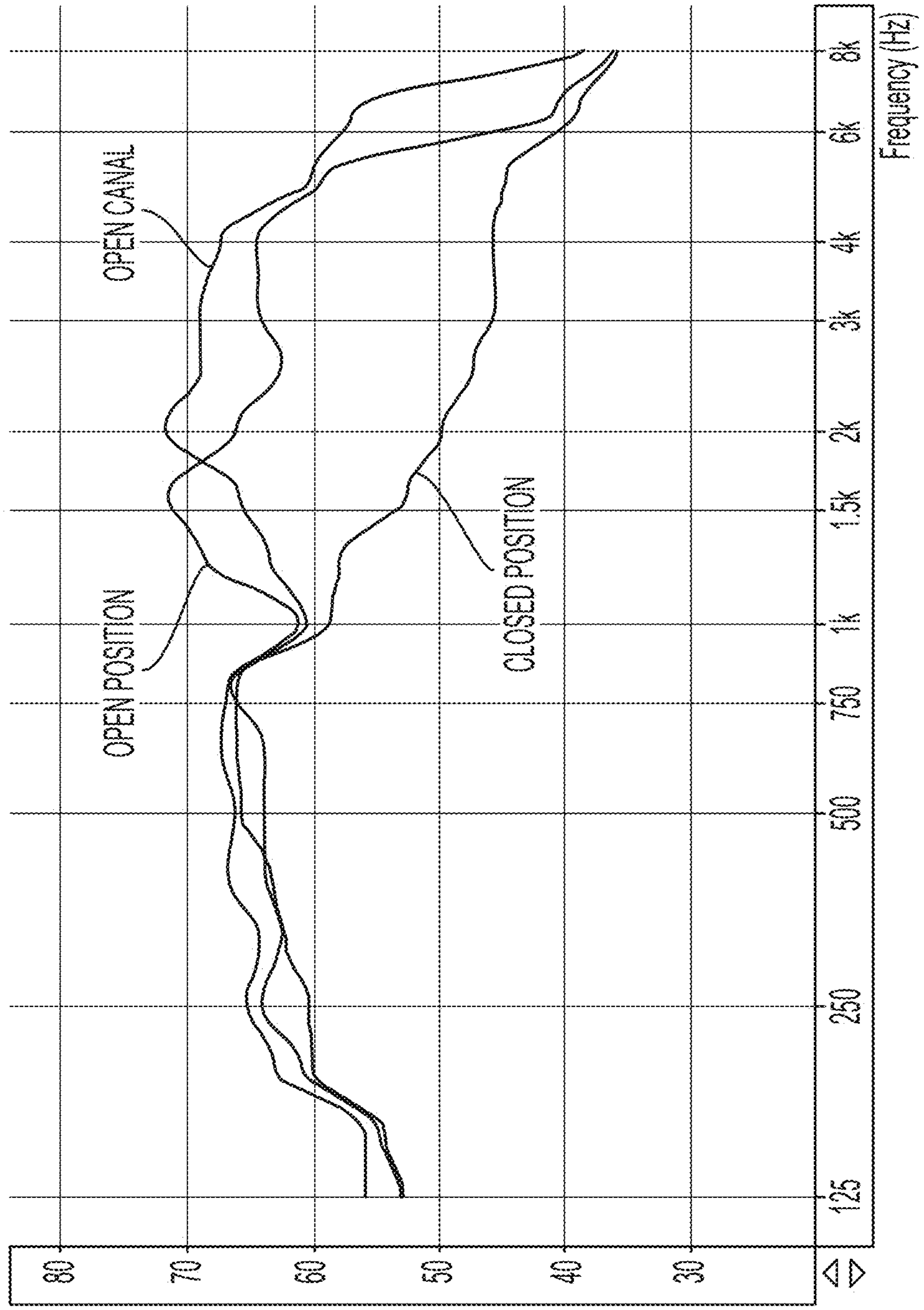
FIG. 13 is a graph showing test data from a sound attenuator in accordance with the invention showing the decibel level of sound received in a user's outer auditory canal without any sound attenuator, with a sound attenuator in an open position, and a sound attenuator in a closed position.

Referring now to FIG. 13, a graph showing test data from a sound attenuator in accordance with the invention is shown. The test data is based on a test of sound delivered to the user at a range of frequencies, and the tested decibel level of sound received in a user's outer auditory canal without any sound attenuator, with the push button actuator 70 in an open position, and the push button actuator 70 in a closed position.

As seen in FIG. 13, the sound attenuator 20 causes very little sound attenuation in the 1.5 kHz to 4 kHz range when the push button actuator 70 is in the open position. The 1.5 kHz to 4 kHz range is the most significant frequency band for human verbal communication, so the user wearing the sound attenuator 20 will not experience any substantial degradation of their ability to hear and speak to others.

In part, the transparency of the sound attenuator 20 when the push button actuator 70 is in the open position is provided by matching the sizing of the one or more openings 76 in the sidewall 74 in base section 32 to the sound tube 60. In particular, a total opening area of the combined one or more openings 76 in the sidewall 74 in base section 32 is equal to or greater than a sound tube end cross-sectional area. In part, the transparency of the sound attenuator 20 is also provided by sizing the sound attenuator 20 so the internal volume of the body 30 acts as a Helmholtz resonator. The body 30 is preferably sized to act as a Helmholtz resonator for frequencies between 1 kHZ and 4 kHz to maximize transparency for voice speech. In one preferred embodiment, the body 30 is sized to act as a Helmholtz resonator tuned to 2 kHz.

The difference in volume between the sound attenuator in an open position and in a closed position is referred to as the "delta." As can also seen in FIG. 13, the sound attenuator has a delta (sound attenuation) of at least 15 decibels in the frequency range between 1.5 kHz and 4 kHz when the sound attenuator in a closed position as compared to when the sound attenuator is in an open position. This is a sufficient sound attenuation to protect the user's hearing from most loud noises.

Figure 14:
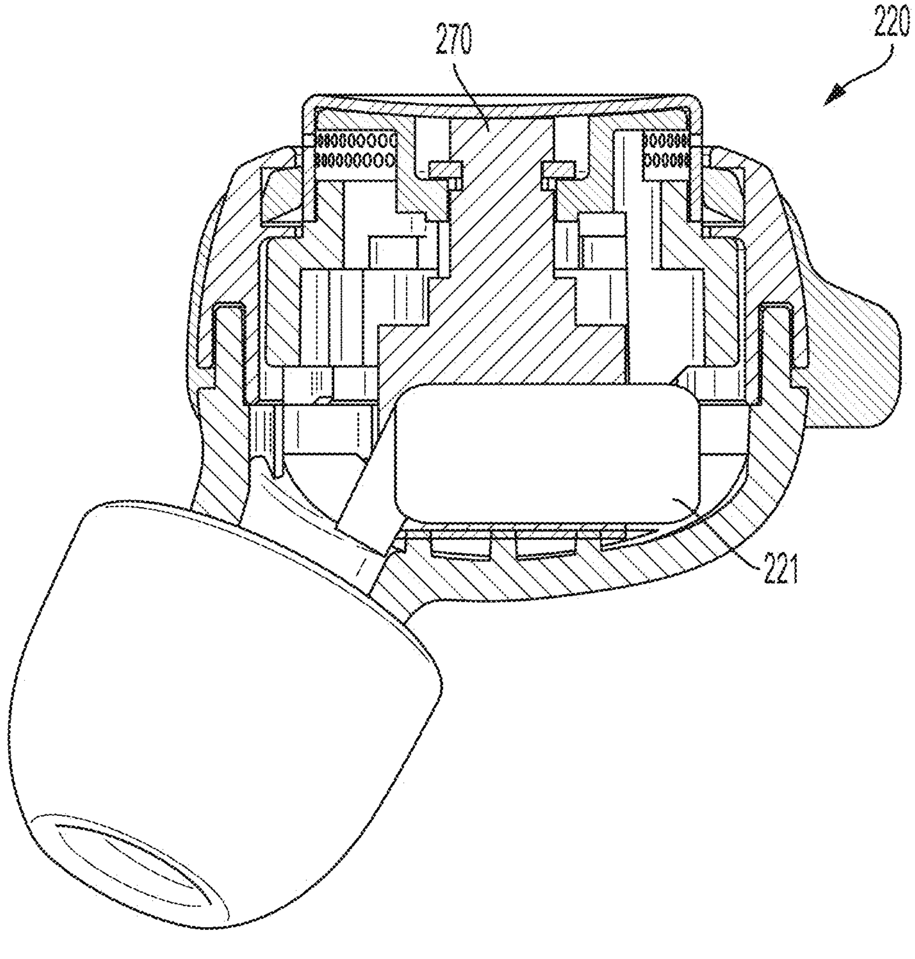
FIG. 14 is a cross-sectional elevation view of an embodiment of an amplified hearing device in accordance with the invention.

FIG. 14 is a cross-sectional elevation view of an embodiment of an amplified hearing device 220 in accordance with the invention. Amplified hearing device 220 is in all material respects the same as the sound attenuator 20 shown in FIGS. 1-19 and described above, but includes as an additional element an amplified hearing device 221 having a speaker located in the body or sound tube to provide an amplified sound.

Accordingly, the present invention provides a sound attenuator and amplified hearing device that provides a nearly instant actuation to switch between a greater degree of environmental sound attenuation and a lesser degree of environmental sound attenuation according to the user's needs in view of the level of the environmental sound. Further, the user is readily able to determine the current open or closed status of the device and can operate it to change the status.

It should be understood that the specific embodiments of the invention herein illustrated and described are intended as representative only and do not define the limits of the invention. Reference should therefore be made to the following appended claims in determining the full scope of the invention.

What is claimed is:

1. The sound attenuator, comprising:

a generally triangular body with curved walls and rounded points having a base section and a top section, the body having a central axis, the base section and top section forming a hollow cavity, the top section having an upper surface and an aperture therein;

a hollow sound tube having an oval cross-section extending from the base section at an angle relative to the central axis, the hollow sound tube having a resilient eartip with an open end at a distal end thereof, an axially movable push button actuator provided in the aperture of the top section, the push button actuator having an outer button surface and a sidewall having one or more openings therein, the sidewall extending from the outer button surface into the aperture into the top section;

a reciprocating mechanism provided in the hollow cavity operably connected to the push button actuator for releasably retaining the push button actuator in a down closed position with one or more openings in the sidewall located in the aperture below the upper surface of the top section, and in an up open position with the one or more openings in the sidewall located above the upper surface of the top section;

a spring biasing the push button actuator outwardly away from the body;

the sound attenuator having a sound attenuation of at least 15 decibels in the frequency range between 1.5 kHz and 4 kHz obtained when the push button actuator in a closed position.

2. The sound attenuator of claim 1, wherein the hollow cavity is a Helmholz resonator tuned to 2 kHz.

3. The sound attenuator of claim 1, wherein the push button actuator outer button surface is generally triangular with curved sides and rounded points.

4. The sound attenuator of claim 3, further comprising one or more seal inserts having an outline shape which matches the outline shape of the push button actuator.

5. The sound attenuator of claim 1, wherein the one or more openings in the sidewall have a total opening area, and open sound tube end has a sound tube end cross-sectional area, and wherein the total opening area is equal to or greater than the sound tube end cross-sectional area.

6. The sound attenuator of claim 1, wherein the one or more openings in the sidewall are located on a portion of the sidewall which faces forward.

7. The sound attenuator, comprising:

a body having a base section and a top section, the body having a central axis, the base section and top section forming a hollow cavity, the top section having an upper surface and an aperture therein;

a hollow sound tube extending from the base section at an angle relative to the central axis, the hollow sound tube having an open sound tube end;

an axially movable push button actuator provided in the aperture of the top section, the push button actuator having an outer button surface and a circumferential flange;

the sound attenuator having a sound attenuation of at least 15 decibels in the frequency range between 1.5 kHz and 4 kHz obtained when the push button actuator in a up closed position;

a reciprocating mechanism operably connected to the push button actuator for releasably retaining the push button actuator in an up closed position with the circumferential flange in sealing engagement with an inner surface of the top section, and in a down open position with the circumferential flange separated from the inner surface of the top section.

8. The sound attenuator of claim 7, wherein the body is generally triangular with curved walls and rounded points and the push button actuator has an outline shape which is generally triangular with curved sides and rounded points.

9. An amplified hearing device, comprising:

a generally triangular body with curved walls and rounded points having a base section and a top section, the body having a central axis, the base section and top section forming a hollow cavity, the top section having an upper surface and an aperture therein;

a hollow sound tube having an oval cross-section extending from the base section at an angle relative to the central axis, the hollow sound tube having a resilient eartip with an open end at a distal end thereof, a speaker located in the body or sound tube to provide an amplified sound;

an axially movable push button actuator provided in the aperture of the top section, the push button actuator having an outer button surface and a sidewall having one or more openings therein, the sidewall extending from the outer button surface into the aperture into the top section;

a reciprocating mechanism provided in the hollow cavity operably connected to the push button actuator for releasably retaining the push button actuator in a closed position with the one or more openings in the sidewall located in the aperture below the upper surface of the top section, and in an open position with the one or more openings in the sidewall located above the upper surface of the top section;

a spring biasing the push button actuator outwardly away from the body whereby when the push button actuator is pushed, the reciprocating mechanism positions the push button actuator in the open position;

the amplified hearing device having a sound attenuation of at least 15 decibels in the frequency range between 1.5 kHz and 4 kHz obtained when the push button actuator in a closed position.

* * * * *